United States Patent [19]

Demizu et al.

[11] Patent Number: 5,229,945
[45] Date of Patent: Jul. 20, 1993

[54] APPARATUS FOR DETECTING AND CALCULATING THE INDICATED MEAN EFFECTIVE PRESSURE FOR A MULTI-CYLINDER ENGINE DURING REAL TIME

[75] Inventors: Akira Demizu; Hitoshi Inoue, both of Hyogo, Japan

[73] Assignee: Mitsubishi Denki K.K., Tokyo, Japan

[21] Appl. No.: 853,010

[22] Filed: Mar. 18, 1992

Related U.S. Application Data

[63] Continuation of Ser. No. 542,559, Jun. 25, 1990, abandoned.

[30] Foreign Application Priority Data

Jun. 27, 1989 [JP] Japan .................................. 1-164725
Jun. 27, 1989 [JP] Japan .................................. 1-164726
Sep. 12, 1989 [JP] Japan .................................. 1-236274

[51] Int. Cl.$^5$ .............................................. G01L 3/26
[52] U.S. Cl. ........................... 364/431.04; 364/431.01; 73/115
[58] Field of Search .................. 364/431.01, 431.03, 364/431.08, 558, 431.04; 123/425, 435; 73/116, 117.3, 35, 115

[56] References Cited

U.S. PATENT DOCUMENTS

| 4,104,907 | 8/1978 | Tsipouras | 364/431.03 X |
| 4,111,041 | 9/1978 | Rice | 364/558 X |
| 4,325,128 | 4/1982 | Abnett et al. | 364/431.04 X |
| 4,401,079 | 8/1983 | Aoki et al. | 123/425 X |
| 4,693,221 | 9/1987 | Nakajima et al. | 364/431.08 X |
| 4,718,382 | 1/1988 | Tanaka | 123/425 |
| 4,819,171 | 4/1989 | Morita | 364/431.08 |
| 4,970,667 | 11/1990 | Abo | 123/425 X |
| 4,971,007 | 11/1990 | Gopp et al. | 123/425 |

FOREIGN PATENT DOCUMENTS

| 3721010 | 1/1988 | Fed. Rep. of Germany . |
| 3721162 | 1/1988 | Fed. Rep. of Germany . |
| 3641130 | 3/1989 | Fed. Rep. of Germany . |
| 61-55349 | 6/1986 | Japan . |

Primary Examiner—Jack B. Harvey
Assistant Examiner—Edward Pipala
Attorney, Agent, or Firm—Sughrue, Mion, Zinn, Macpeak & Seas

[57] ABSTRACT

An apparatus for detecting the in-cylinder pressure of an internal combustion engine having a plurality of cylinders and for providing in-cylinder pressure parameters is described which comprises a plurality of pressure sensors for detecting the pressures in the respective cylinders, a signal selector, a microcomputer and a crank angle sensor. The signal selector sequentially selects the pressure signals from the pressure sensors to be transfer to the computer and the computer computes the pressure parameters in accordance with the received signals for each of the cylinders. The operation of the apparatus is executed by referring to the crank angle signal from the crank angle sensor.

24 Claims, 8 Drawing Sheets

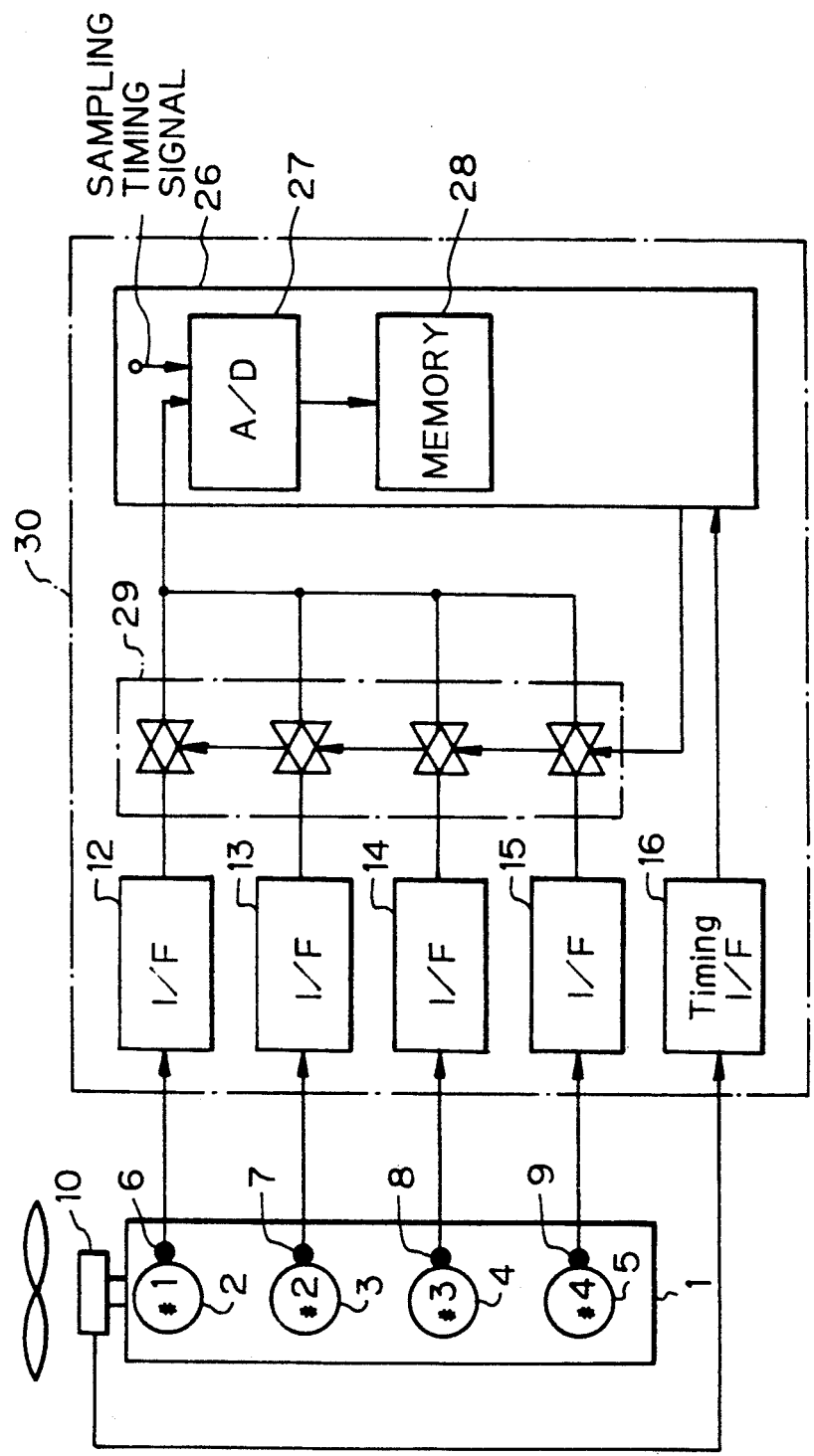

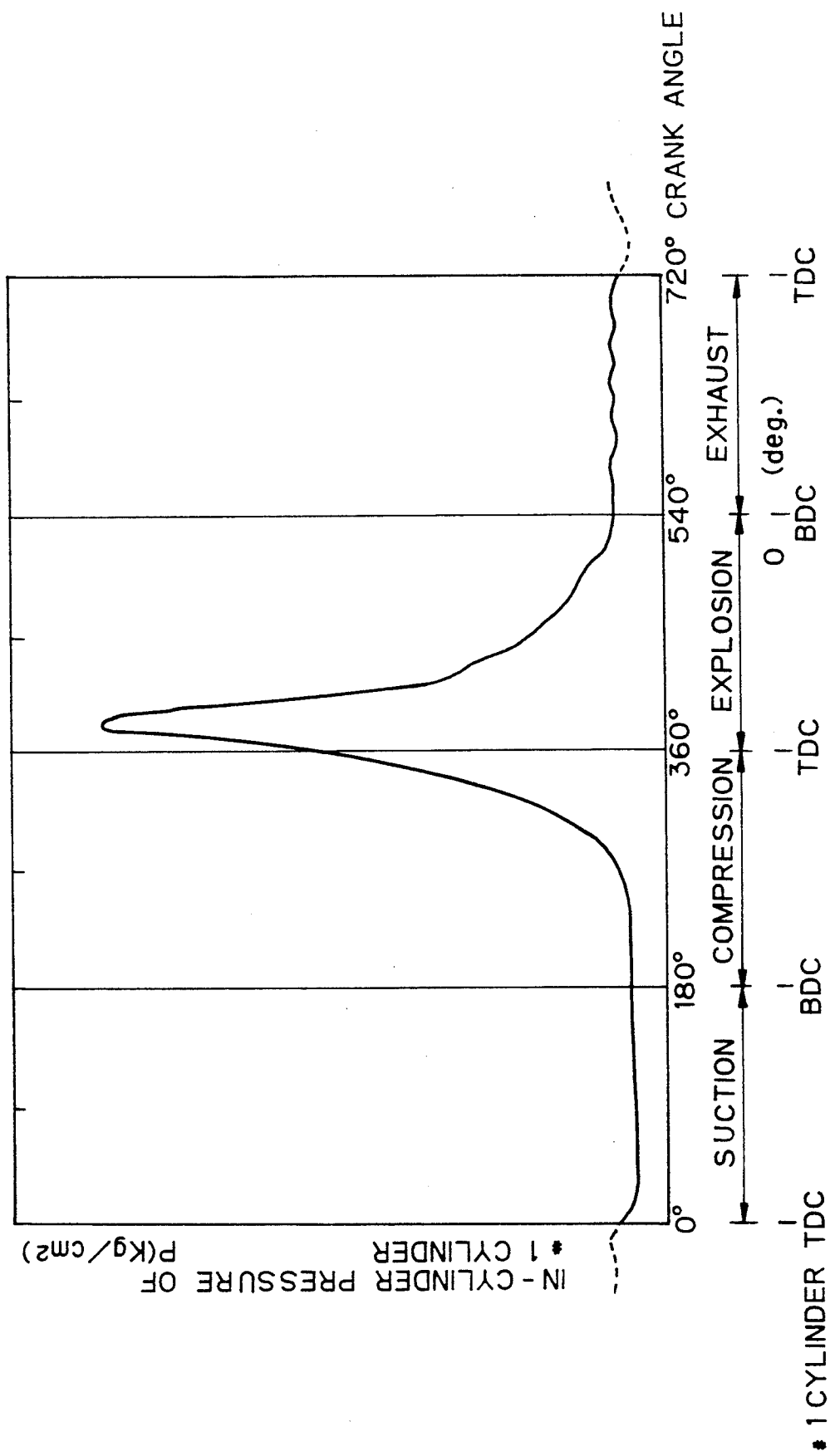

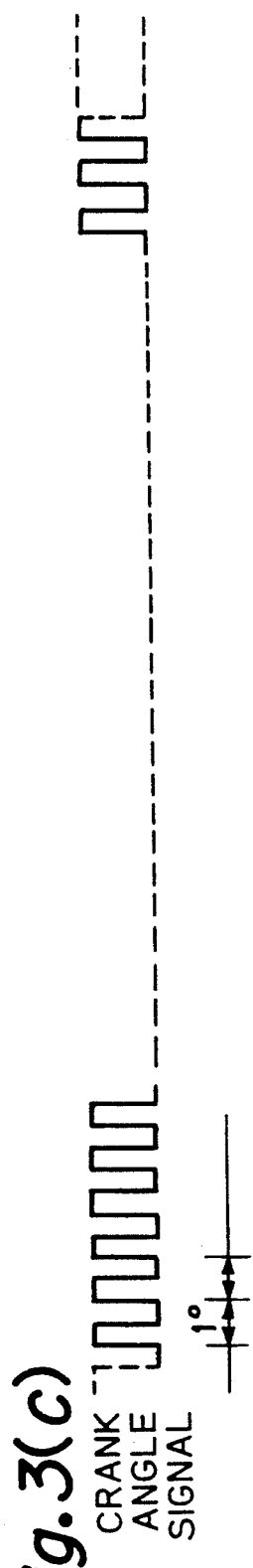
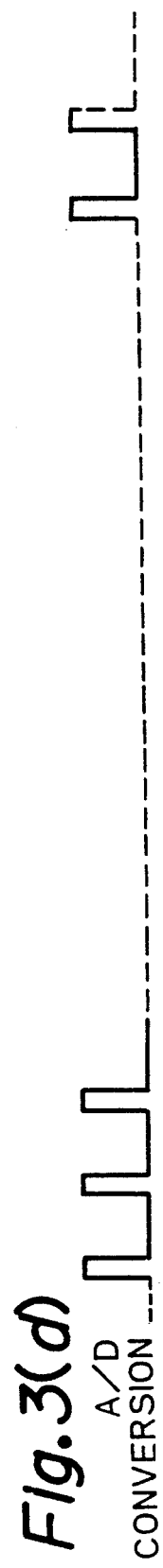
Fig.3(b) SYLINDER IDENTIFYING SIGNAL
Fig.3(c) CRANK ANGLE SIGNAL
Fig.3(d) A/D CONVERSION
1 CYLINDER SAMPLING PERIOD

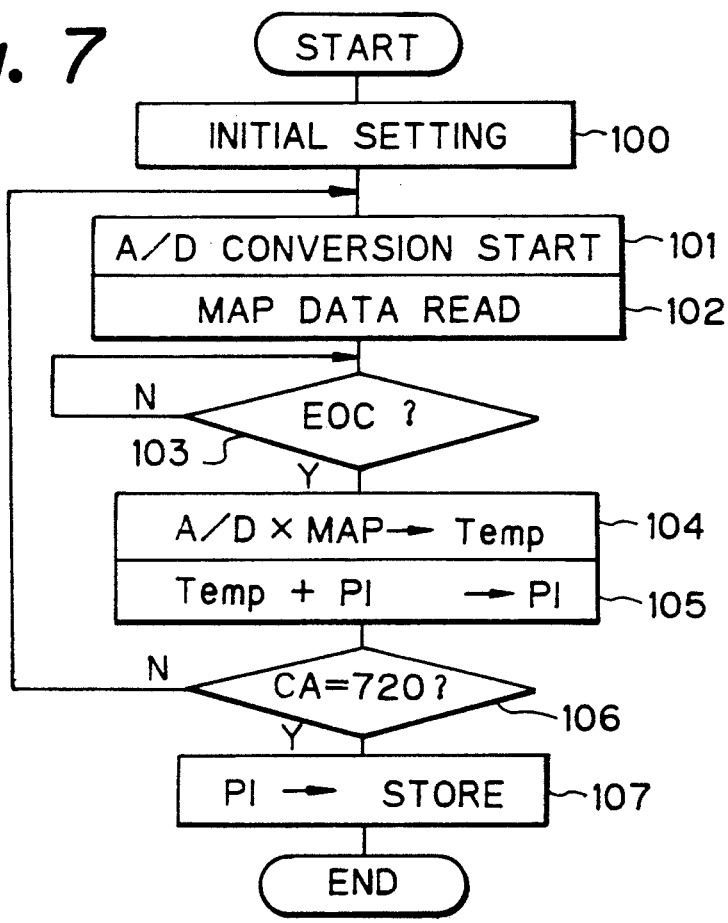
Fig. 7
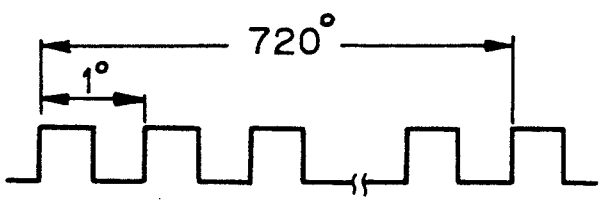
Fig. 8(a) CRANK ANGLE SIGNAL
Fig. 8(b) A/D CONVERSION
Fig. 8(c) COMPUTATION PROCESSING
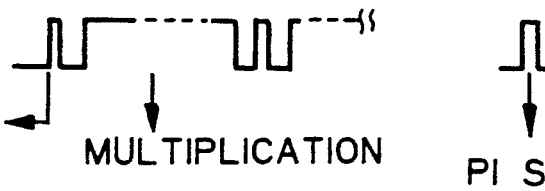
A/D START AND MAP READ    MULTIPLICATION    PI STORE

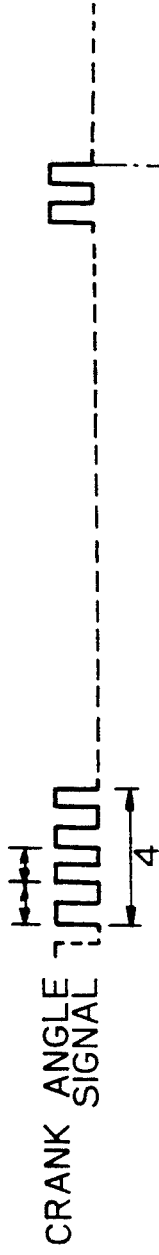
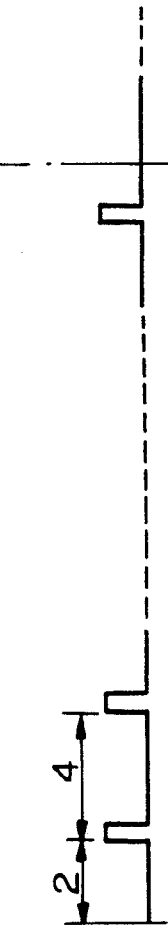
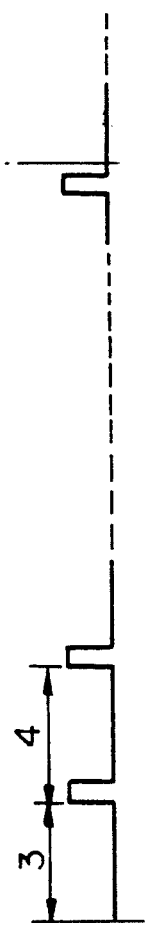
Fig.9(a) #1 CYLINDER IDENTIFYING SIGNAL
Fig.9(b) CRANK ANGLE SIGNAL
Fig.9(c) #1 CYLINDER A/D CONVERSION TIMING
Fig.9(d) #3 CYLINDER A/D CONVERSION TIMING
Fig.9(e) #4 CYLINDER A/D CONVERSION TIMING
Fig.9(f) #2 CYLINDER A/D CONVERSION TIMING

1

APPARATUS FOR DETECTING AND CALCULATING THE INDICATED MEAN EFFECTIVE PRESSURE FOR A MULTI-CYLINDER ENGINE DURING REAL TIME

This is a continuation of application Ser. No. 07/542,559 filed Jun. 25, 1990 now abandoned.

BACKGROUND OF THE INVENTION

1. Field of the Invention

This invention relates to an apparatus for detecting the in-cylinder pressure of an internal combustion engine having a plurality of cylinders and for providing pressure parameters.

2. Prior Art

There has hitherto been commonly known an apparatus for detecting the pressure of cylinders of a multi-cylinder engine to analyze the characteristics thereof, as shown in FIG. 1 and which comprises an engine 1 having #1–#4 cylinders 2–5, pressure sensors 6–9 for detecting the pressures in the respective cylinders 2–5, a crank angle sensor 10 for generating pulses in response to the crank angle of the engine 1 to determine the timing of the pressure detection and an in-cylinder pressure measuring section 11 for receiving outputs from the pressure sensors 6–9 and the crank angle sensor 10 to measure the pressures in the cylinders. The pressure measuring section 11 includes interfaces (I/F) 12–15 for converting the outputs from the pressure sensors 6–9 to voltage values, a timing interface 16 which receives the output of the crank angle sensor 10, A/D converters 17–20 for converting the outputs from the interfaces 12–15 to digital values, memories 21–24 for storing the digital values from the A/D converters 17–20 and a data collecting/analyzing device 25 which receives the outputs of the timing interface 16 and memories 21–24, generates outputs to the A/D converters 17–20 and memories 21–24 to control the number of data samples and the commencement and termination of measurement, and performs the analysis of the measured data. The data collecting/analyzing device 25 may be constituted by a personal computer, for example, and the pressure measuring section 11 is commercially available.

With the above-described arrangement, the pressure sensors 6–9 detect the pressure in the cylinders 2–5 and the crank angle sensor 10 generates a basic angle pulse for each predetermined interval (interval of 1° of the crank angle, for example). The outputs from the pressure sensors 6–9 are input through the interfaces 12–15 and the A/D converters 17–20 to the memories 21–24 and stored therein as the digital values and further are input to the data collecting/analyzing device 25. The output from the crank angle sensor 10 is input through the interface 16 to the data collecting/analyzing device 25. According to these inputs, the data collecting/analyzing device 25 continuously collects data at predetermined crank angle intervals, the number of samples being determined by the capacity of the memories 21–24, analyzes the data after the termination of collection and provides evaluation indices indicating the engine characteristics, such as changes in pressure in $P(\theta)$ (correlation between the pressure and crank angle) diagram, P-V (correlation between the stroke volume and pressure) diagram, Pi (indicated mean effective pressure), etc.

In the above-described prior apparatus, however, it is essentially impossible to make a real-time measurement, because the prior apparatus is of a type in which the pressure data are continuously collected and stored and then arranged to provide the evaluation indices for analyzing the characteristics. Thus, the prior apparatus is not suitable, for example, for an engine control arranged so that the engine operation characteristics are detected and corrected or modified when they are deteriorating. There are further problems such that in order to evaluate the engine performance it is necessary to provide a certain number of combustion cycles for data collection, for example, at least 30 cycles is necessary for an acceleration test from an idling condition of 750 rpm to 6000 rpm, and this requires that the memories 21–24 have a capacity of 21.6 Kbytes [=30 (cycles)×720 (one stroke crank angle of 4-cycle engine)×1 byte (capacity for storing the ordinary amount of pressure data)]. If 2 bytes is necessary to store the pressure data, the capacity must be doubled and the cost will increase accordingly.

SUMMARY OF THE INVENTION

The present invention has been made to solve such problems as described above and it is a first object of the present invention to provide an apparatus for detecting the in-cylinder pressure of an internal combustion engine and for providing pressure parameters, capable of making a real-time measurement of the in-cylinder pressure, being applied to an engine control and reducing the memory capacity and cost.

A second object of the present invention is to provide an apparatus for detecting the in-cylinder pressure of an engine which can compute an indicated mean effective pressure thereof to allow the engine to be controlled in accordance therewith and enable a reduction in the memory capacities for storing pressure data.

The first object is attained by an apparatus for detecting the in-cylinder pressure of an internal combustion engine which includes signal selecting means for sequentially changing over and selecting the outputs of respective pressure detecting means for detecting the in-cylinder pressures of the respective cylinders at every combustion cycle or at every predetermined crank angle, and computing and storing means for computing and storing the output from the signal selecting means in response to the output of crank angle detecting means.

The second object is attained by an apparatus for detecting the in-cylinder pressure of an internal combustion engine which comprises signal selecting means for sequentially changing over and selecting the outputs of respective pressure detecting means for detecting the in-cylinder pressures of the respective cylinders at every combustion cycle or at every predetermined crank angle, storing means for storing the indicated volume of the cylinders or the rate of change in the volume thereof relative to the crank angle as map data and computing means for multiplying the output of the signal selecting means and the map data at every generation of a crank angle signal, and adding, or integrating the products in one combustion cycle to compute an indicated mean effective pressure.

BRIEF DESCRIPTION OF THE DRAWINGS

FIG. 2 is a block diagram of an embodiment of the present invention;

FIGS. 3(a) through 3(d) are diagrams showing in-cylinder pressure characteristics and wave-forms of cylinder identifying, crank angle and A/D conversion timing signals of the embodiment shown in FIG. 2;

FIGS. 7 and 8(a) through 8(c), are flow chart and time charts showing the operation of computing the indicated means effective pressure; and FIGS. 9(a) through 9(f) are diagrams showing waveforms for explaining another sampling timing of this invention.

DETAILED DESCRIPTION OF THE PREFERRED EMBODIMENT

Figure 1:
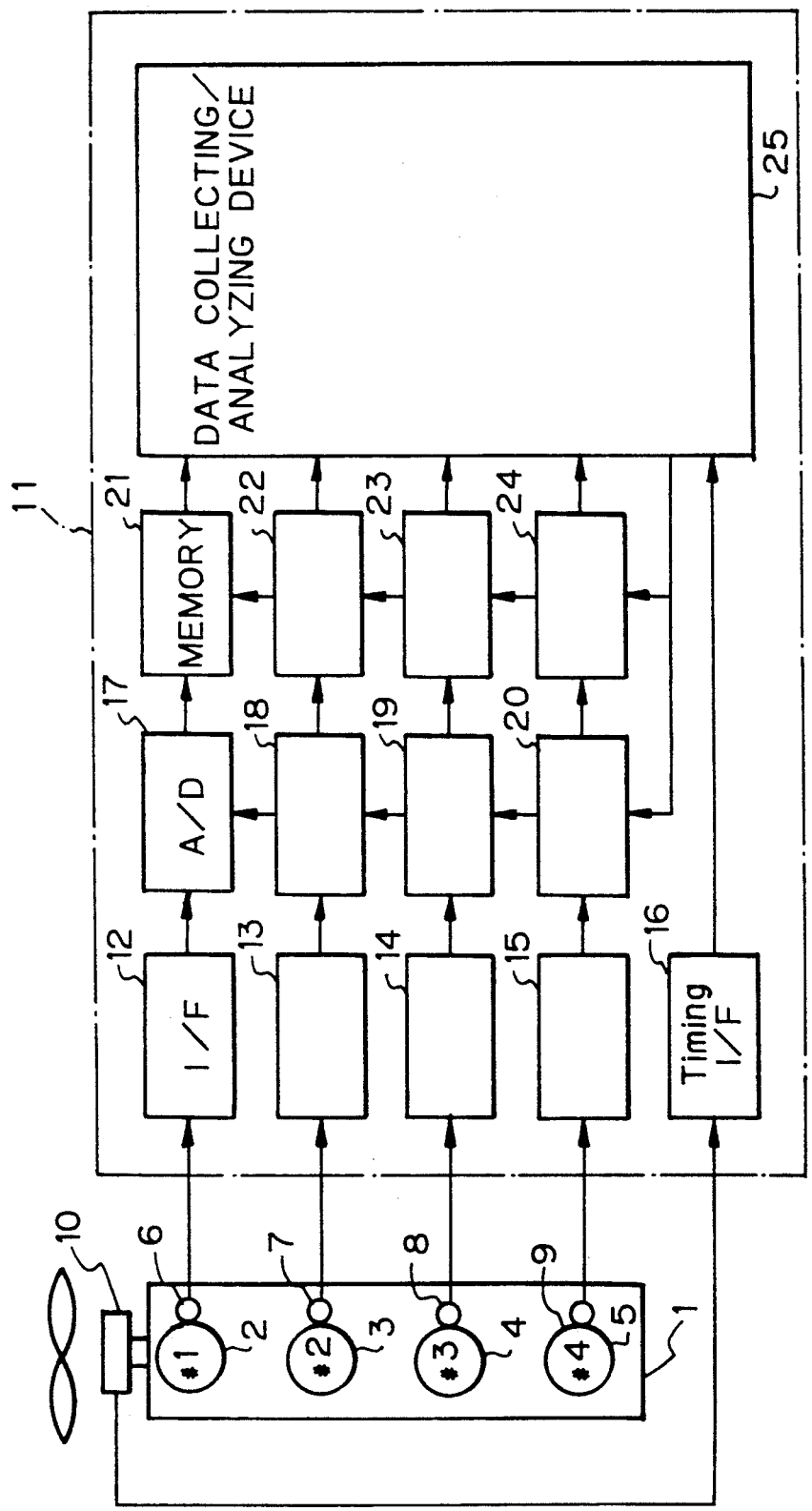
FIG. 1 is a block diagram of a prior art apparatus.

Embodiments of the present invention will now be described by reference to the drawings. FIG. 2 is a block diagram illustrating an apparatus for detecting the in-cylinder pressure of an internal combustion engine according to an embodiment. In this drawing, the same components are denoted by the same numbers are shown in FIG. 1. The apparatus includes a single chip microcomputer 26 having an A/D converter 27 and a memory 28, a multiplexer 29 having a plurality of transfer gates for selecting and changing over the outputs of the interfaces 12-15. The interfaces 12-16, the multiplexer 29 and the microcomputer 26 constitute an in-cylinder pressure measuring section 30.

With the arrangement described above, the outputs from the pressure sensors 6-9 are input through the interfaces 12-15 to the multiplexer 29 by which one of the signals from the interfaces is, in turn, selected and provided to the microcomputer 26. FIGS. 3(a) to (d) show changes in the pressure of the cylinder 2 relative to the crank angle of a 4-stroke cycle engine and the wave-forms of the main portions thereof. The abbreviation TDC indicates the top dead center of the cylinder 2 and BDC also the bottom dead center thereof. The pressure changes of the other cylinders 3-5 are similar to those of the cylinder 2, but are shifted 180° in phase from one another. The crank angle sensor 10 detects crank angles and generates a #1 cylinder identifying signal for every interval of 720° and a crank angle signal having an interval of 1°, as shown in FIGS. 3(b) and (c). The crank angle signal is used as the basic timing signal of the section 30. These signals are input through the timing interface 16 to the microcomputer 26. In response thereto, the microcomputer 26 controls the multiplexer 29 to output the pressure signal from the interface 12 to the A/D converter 27 during a first cycle 0°-720° and the AD converter 27 to convert the received analog signal to the corresponding digital signal for each interval of a predetermined crank angle, for example, a 2° interval as shown in FIG. 3(d). The A/D converted pressure signals are then stored in the memory 28, and are analyzed by the microcomputer 26.

Figure 4A:
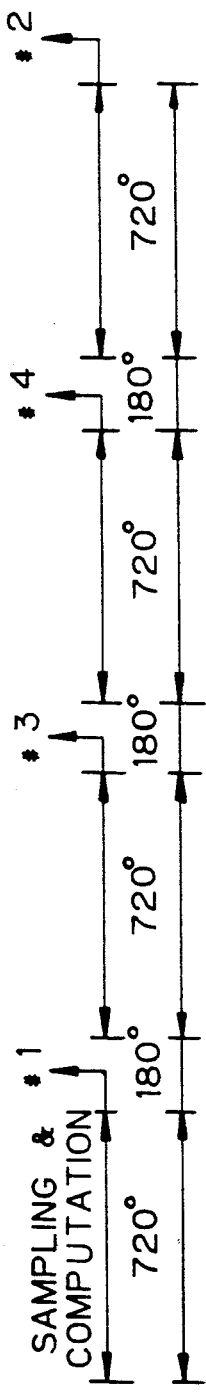
FIGS. 4(a) through 4(c) are diagrams showing a sequence for detecting the in-cylinder pressure of the embodiment.

Such a sequence is repeated at an interval of 720° after an interval of 180°, as shown in FIG. 4(a). Thus, the pressure data of #1 cylinder 2 is A/D-converted in one combustion cycle from the suction stroke to the exhaust stroke, and the data is processed in the succeeding crank angle interval of 180°. Similarly, the A/D-conversion and data processing are achieved at intervals of 720°+180° in the order of #3, #4 and #2 cylinders 4, 5 and 3, respectively. Thus, the data collection for each of the cylinders 2-5 is sequentially but intermittently performed once in four intervals. In the case of there being n-numbers of cylinders, the cycle of measurement for each cylinder is one in n-intervals, and the crank angle interval between a certain collection and its succeeding collection intervals is 720°/n.

The in-cylinder pressure information collected and analyzed by the microcomputer 26 includes (1) a parameter computed at every measuring crank angle (2° in this case), such as, for example, $dP/d\theta$, where $\theta$: crank angle and P: in-cylinder pressure; (2) a parameter computed at the termination of the measurement of one combustion cycle, such as, for example, Pi (indicated mean effective pressure), etc. In the case of (1), the microcomputer 26 carries out the computation, the differential $dP/d\theta$ after the termination of the A/D-conversion by the A/D converter 27 and stores the result in the memory 28. In the case of (2), based on the information of $dP/d\theta$ stored in the memory, an evaluation index, for example Pi, is obtained by converting the $dP/d\theta$ information in the period up to the next signal collection interval.

Figure 4B:
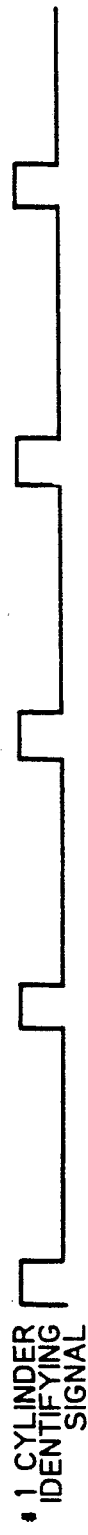
Figure 4C:

The capacity of the memory 28 for storing the information is the number of cylinders multiplied by the number of samples (for example, 4×720=2880 bytes even when the signal is sampled for each interval of 1°) plus $\alpha$ ($\alpha$: the capacity of a temporary register for use during the conversion to respective evaluation indices), and thus the capacity can be considerably reduced as compared to the prior art. FIGS. 4(b) and (c) again show the outputs of the crank angle sensor 10 illustrated in FIGS. 3(b) and (c).

Figure 5:
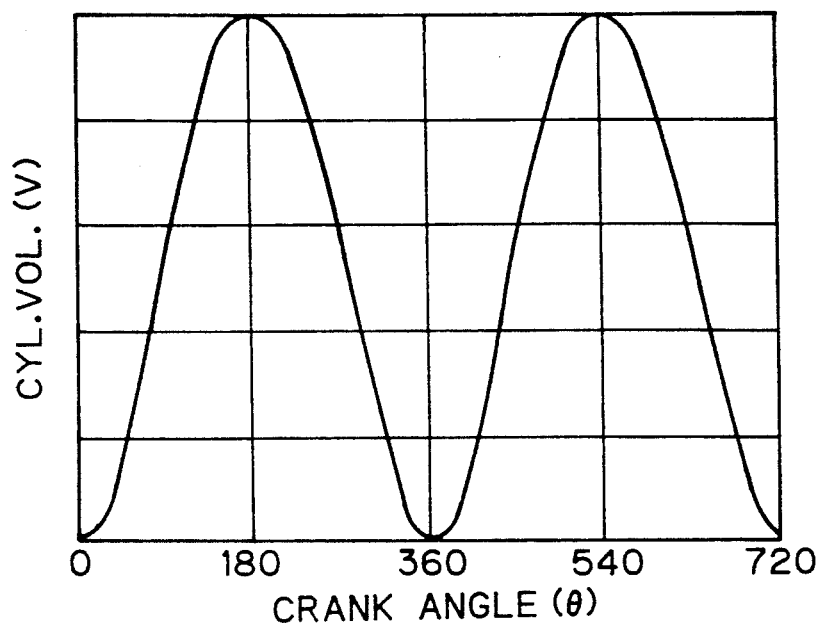
FIG. 5 is a diagram illustrating cylinder volume characteristics.
Figure 6:
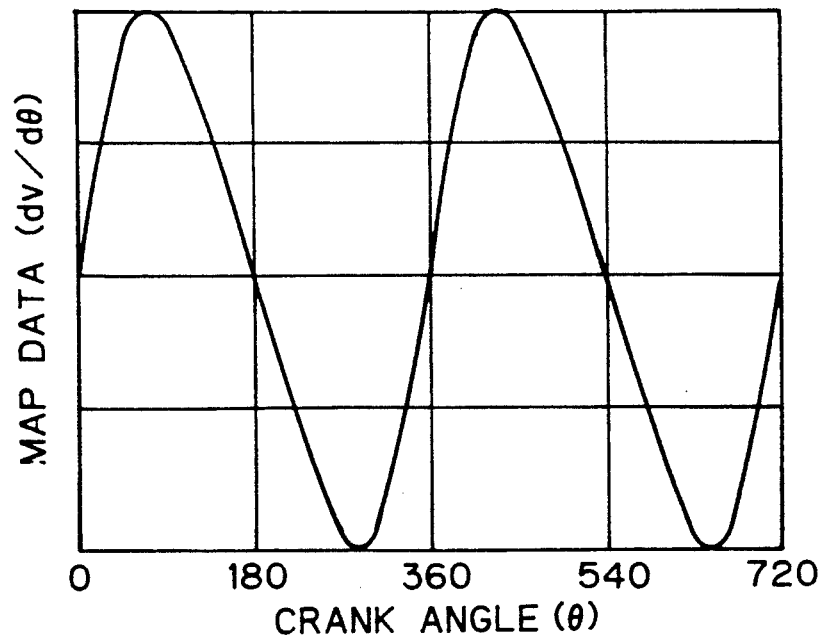
FIG. 6 is a diagram showing map data characteristics.

The computation of the indicated mean effective pressure Pi as a pressure parameter will be described below in detail. An indicated work Wi carried out by the engine in one combustion cycle is represented such as: $Wi = \int P \cdot dV$ (kg·cm), where P is in-cylinder pressure (kg/cm$^2$) and V is cylinder volume (cm$^3$). The indicated mean effective pressure Pi is obtained by dividing the indicated work Wi by a stroke volume Vh (cm$^3$): $Pi = Wi/Vh$ (kg/cm$^2$). The computation equation practically used is as follows:

$$Pi = \sum_{CA=1}^{720} [P_{AD} \times M_{CA}]$$

where CA is a crank angle, $P_{AD}$ is a value of A/D-converted output of the pressure sensor 6, 7, 8 or 9 at every crank angle of 1°, and $M_{CA}$ is a value corresponding to dV read out from the map by referring to the crank angle $\theta$, where the value $M_{CA}$ ($=dV/d\theta$) is obtained as follows: FIG. 5 shows characteristics of the volume V of a cylinder relative to the crank angle $\theta$, and the relation of the rate of change in the volume to the crank angle shown in FIG. 6 is obtained from the relation shown in FIG. 5. The relation shown in FIG. 6 is prestored as map data in the memory 28 of the microcomputer 26, and the prestored map data is read out as the value $M_{CA}$ in accordance with the crank angle $\theta$.

FIGS. 7 and 8 show flow and time charts, respectively, for carrying out the computation of the indicated mean effective value Pi. In FIG. 7, at step 100, a PI counter is cleared and the map address is initialized. Also, all the components are synchronized to the suction TDC of #1 cylinder 2. At step 101, the A/D-conversion commences as shown in FIG. 8(b) coincident with a rise in the crank angle signal, as shown in FIG. 8(a), thereby the collection of the pressure signals are started. At step 102, the map data is read out as shown in FIG. 8(c). At step 103, a decision is made as to whether or not the A/D-conversion at a crank angle $\theta$ (1°–720°) has ceased, and if so the A/D-converted pressure data $P_{AD}$ is multiplied by the map data $M_{CA}$ read out at step 102 and the resulting product is stored in the temporary register Temp at step 104. At step 105, the value of Temp is added to the PI register, or counter and the added value is set as a new PI. At step 106, a decision is made as to whether or not CA, or crank angle attains 720° and if the decision is "no", the process accordingly proceeds to step 101, and the above-described routine is repeated for one combustion cycle from the crank angle of 1° to 720° to compute the indicated mean effective pressure Pi, and at step 107, the obtained Pi is stored in the PI register. By the way, the cylinder volume may be stored as map data instead of the change in the cylinder volume. In this case, it is necessary to compute dV/dt at step 104.

Although the above-described embodiment is so arranged that the outputs of the respective pressure sensor 6–9 are sequentially changed over at every combustion cycle and then supplied to the microcomputer 26, it is possible for the sensor outputs of four cylinders to be changed over at a predetermined crank angle, such as 1°, for example, as shown in FIGS. 9(a) to (f), and then are supplied to the microcomputer 26. When the in-cylinder pressure is measured by such a sequence, the in-cylinder information of all of the cylinders can be obtained for each interval of 720°.

Furthermore, in this sequence it is necessary to compute the indicated mean effective pressure Pi such that the computed value at the termination of measurement in one combustion cycle from suction to exhaust for each cylinder represents the evaluation index.

In this case, the memory capacity of the memory 28 is the number of samples (720 bytes, for example when the sampling is executed for each interval of 1°) plus $\alpha$, and the memory capacity is further reduced.

Although the above case is so arranged that the crank angle sensors have the precision of 1° for angle detection, it will be apparent that when the precision of angle detection of the crank angle sensors for n-cylinder engine is x°, the in-cylinder pressure information can be measured at an interval of (n/x)° for each cylinder.

Although the present invention has been described through specific terms, it should be noted here that the described embodiment is not necessarily exclusive and that various changes and modifications may be imparted thereto without departing from the scope of the invention which is limited solely by the appended claims.

What is claimed is:

1. An apparatus for detecting the in-cylinder pressure of an internal combustion engine having a plurality of cylinders and for providing in-cylinder pressure parameters used in engine control comprising:

a plurality of pressure detecting means for detecting the pressures in said respective cylinders;

crank angle detecting means for detecting a crank angle of said engine to generate a basic timing signal;

signal selecting means for sequentially selecting the pressure signals based on said timing signal from said pressure detecting means; and computer means for receiving the sequentially selected pressure signals for a combustion cycle from said selecting means for each interval of a predetermined unit crank angle uniformly distributed through said combustion cycle and for computing, during a crank interval succeeding the combustion cycle, said pressure parameters, including a mean effective pressure, for each of said cylinders in accordance with the received pressure signals.

2. An apparatus according to claim 1, wherein said signal selecting means comprises a multiplexer having a plurality of transfer gates which sequentially transfer the respective pressure signals to said computer means.

3. An apparatus according to claim 2, wherein each of said transfer gates controls the transfer of the corresponding pressure signal for a combustion cycle starting from a predetermined condition of the corresponding cylinder, obtained in accordance with said basic timing signal.

4. An apparatus according to claim 2, wherein said transfer gates sequentially transfer the respective pressure signals at an interval of a predetermined crank angle, obtained in accordance with said basic timing signal.

5. An apparatus according to claim 3, wherein said computer means includes an A/D converter for converting the pressure signal received at said computer means to a digital signal at an interval of a predetermined crank angle obtained in accordance with said basic timing signal, and a memory for storing said digital signals and said pressure parameters computed on the basis of said digital signals.

6. An apparatus according to claim 4, wherein said computer means includes an A/D converter for converting the pressure signal received at said computer means to a digital signal at said interval of said predetermined crank angle, and a memory for storing said digital signals and said pressure parameters computed on the basis of said digital signals.

7. An apparatus according to claim 5, wherein said memory further prestores a map containing the relationships between a cylinder volume or the change rate thereof and a crank angle, and said computing means performs the multiplication of the output from said A/D converter and the data read out from said map in respect of a given crank angle, and integrates the resulting product during said combustion cycle to obtain an indicated mean effective pressure as said pressure parameter.

8. An apparatus according to claim 7, wherein said one combustion cycle equals a crank angle interval of 720°, and said succeeding crank interval equals 180°.

9. An apparatus for detecting the in-cylinder pressure of an internal combustion engine having a plurality of cylinders and for providing in-cylinder pressure parameters used in engine control comprising:

a plurality of pressure detecting means for detecting the pressures in said respective cylinders;

crank angle detecting means for detecting a crank angle of said engine to generate a basic timing signal;

signal selecting means including a multiplexer for sequentially selecting the pressure signals from said pressure detecting means based on said timing signal;

computer means for receiving the sequentially selected pressure signals from said selecting means and for computing said pressure parameters, including a mean effective pressure, for each of said cylinders in accordance with the received signals, said computer means receiving pressure signals corresponding to a selected cylinder for one combustion cycle and computing said pressure parameters during a crank interval succeeding said combustion cycle, before receiving pressure signals corresponding to a next selected cylinder.

10. An apparatus according to claim 1, wherein said computer means calculates the mean effective pressure based on the following equation:

$$P_i = \sum_{CA=1}^{720} [P_{AD} \times M_{CA}];$$

where $P_i$ equals the mean effective pressure, CA equals a crank angle of a corresponding cylinder, $P_{AD}$ equals the pressure signal received at said crank angle and $M_{CA}$ equals an incremental change in volume of said corresponding cylinder per unit crank angle.

11. An apparatus according to claim 9, wherein said computer means calculates the mean effective pressure based on the following equation:

$$P_i = \sum_{CA=1}^{720} [P_{AD} \times M_{CA}];$$

where $P_i$ equals the mean effective pressure, CA equals a crank angle of a corresponding cylinder, $P_{AD}$ equals the pressure signal received at said crank angle and $M_{CA}$ equals an incremental change in a volume of said corresponding cylinder per unit crank angle.

12. An apparatus for detecting the in-cylinder pressure of an internal combustion engine having a plurality of cylinders, comprising:
  a plurality of pressure detectors for detecting a pressures in corresponding cylinders of the engine,
  a crank angle detector for detecting a crank angle of the engine to generate a crank angle signal, said crank angle signal including multiple pulses evenly distributed through a combustion cycle of the engine,
  signal selecting means, connected to the pressure detectors, for sequentially selecting each of said pressure detectors based on said crank angle signal,
  a computer, connected to the signal selecting means, for receiving pressure signals from selected pressure detectors and for computing an indicating mean effective pressure (IMEP), said computer means controlling the signal selecting means to sequentially select each cylinder during successive pulses from the crank angle signal, such that the computer means receives a pressure signals from every cylinder during a single combustion cycle.

13. An apparatus according to claim 12, wherein the computer means calculates a mean effective pressure for every cylinder during a crank interval which immediately follows and is shorter than said single combustion cycle.

14. An apparatus according to claim 12, wherein the angle detector means generates a pulse during each one degree increment of the crank angle, said signal selecting means selecting a different detector during each consecutive pulse.

15. An apparatus according to claim 12, wherein said crank angle detecting means outputs said pulses throughout a combustion cycle at predetermined crank angles, said signal selecting means sequentially selecting each cylinder during successive predetermined crank angle intervals.

16. An apparatus according to claim 12, wherein said signal selecting means comprises a multiplexer having a plurality of transfer gates which sequentially transfer the respective pressure signals to said computer means.

17. An apparatus according to claim 16, wherein each of said transfer gates controls the transfer of the corresponding pressure signal for a combustion cycle starting from a predetermined condition of the corresponding cylinder, obtained in accordance with said crank angle signal.

18. An apparatus according to claim 12, wherein said computer means includes an A/D converter for converting the pressure signal received at said computer means to a digital signal at an interval of a predetermined crank angle obtained in accordance with said crank angle signal, and a memory for storing said digital signals and said pressure parameters computed on the basis of said digital signals.

19. An apparatus according to claim 18, wherein said memory further prestores a map containing the relationships between a cylinder volume or the change rate thereof and a crank angle, and said computing means performs the multiplication of the output from said A/D converter and the data read out from said map in respect of a given crank angle, and integrates the resulting product during said combustion cycle to obtain an indicated mean effective pressure as said pressure parameter.

20. An apparatus according to claim 9, wherein said multiplexer has a plurality of transfer gates which sequentially transfer the respective pressure signals to said computer means.

21. An apparatus according to claim 20, wherein each of said transfer gates controls the transfer of the corresponding pressure signal for a combustion cycle starting from a predetermined condition of the corresponding cylinder, obtained in accordance with said basic timing signal.

22. An apparatus according to claim 20, wherein said transfer gates sequentially transfer the respective pressure signals at an interval of a predetermined crank angle, obtained in accordance with said basic timing signal.

23. An apparatus according to claim 9, wherein said computer means includes an A/D converter for converting the pressure signal received at said computer means to a digital signal at an interval of a predetermined crank angle obtained in accordance with said basic timing signal, and a memory for storing said digital signals and said pressure parameters computed on the basis of said digital signals.

24. An apparatus according to claim 23, wherein said memory further prestores a map containing the relationships between a cylinder volume or the change rate thereof and a crank angle, and said computing means performs the multiplication of the output from said A/D converter and the data read out from said map in respect of a given crank angle, and integrates the resulting product during said combustion cycle to obtain an indicated mean effective pressure as said pressure parameter.

* * * * *